W. THOMAS.
GAS HEATING ATTACHMENT FOR PIPES OF HEATING SYSTEMS.
APPLICATION FILED NOV. 23, 1909.
971,938.
Patented Oct. 4, 1910.
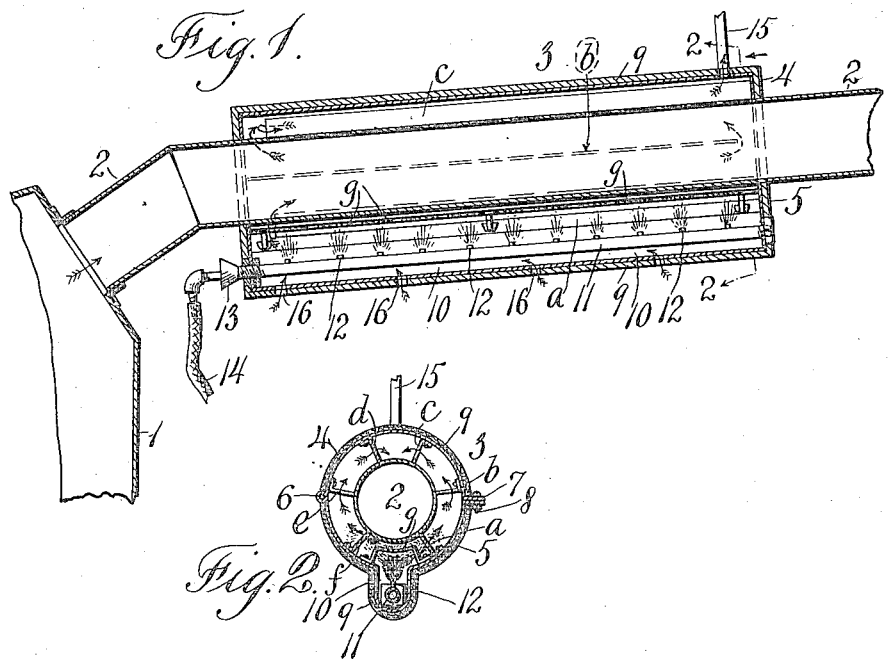
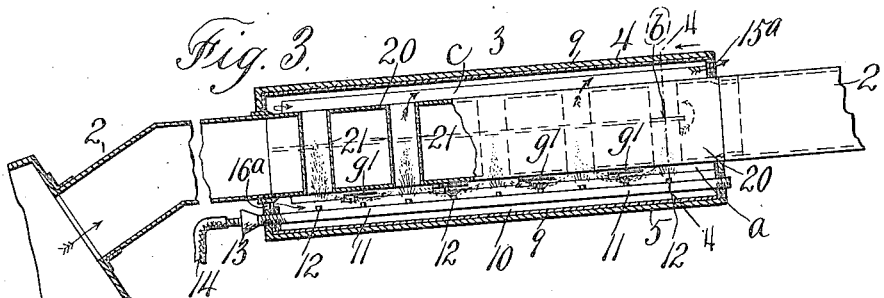
Witnesses
W. Ellwood Allen
A. Cooper
Inventor
Walter Thomas
By E. B. Clark
Attorney

UNITED STATES PATENT OFFICE.

WALTER THOMAS, OF VANCOUVER, BRITISH COLUMBIA, CANADA.

GAS-HEATING ATTACHMENT FOR PIPES OF HEATING SYSTEMS.

971,938.   Specification of Letters Patent.   Patented Oct. 4, 1910.

Application filed November 23, 1909. Serial No. 529,634.

*To all whom it may concern:*

Be it known that I, WALTER THOMAS, a subject of the Kingdom of Great Britain, residing at Vancouver, in the county of Vancouver and Province of British Columbia, Canada, have invented certain new and useful Improvements in Gas-Heating Attachments for Pipes of Heating Systems, of which the following is a specification.

This invention relates to a gas heating-jacket attachment or auxiliary heater for the pipes of hot air and hot water heating systems.

The principal object of my invention is to provide a sectional gas heating jacket which may be readily applied to, or detached from, a hot air pipe or hot water pipe of a heating system, or other pipe for heating a single room in a dwelling, without the necessity of lighting a fire in the furnace of the system.

Another object is to provide an auxiliary heater, for a heating pipe, having means for greatly increasing the heating and radiating surface, in connection with a gas heating-jacket attachment.

My gas heating-jacket may be applied to one or more pipes of a hot air or hot water furnace for heating one or more rooms as desired.

The matter constituting my invention will be defined in the claims.

I will now describe my invention in detail by reference to the accompanying drawings, in which—

Figure 1 represents a longitudinal section of my heating-jacket applied to a hot air pipe of a furnace. Fig. 2 represents a transverse section of the same, on line 2—2, Fig. 1. Fig. 3 represents a longitudinal section of the heating-jacket and a modified construction of a section of hot air pipe. Fig. 4 represents a transverse section of the same, on line 4—4, Fig. 3.

At certain seasons of the year, when the weather is not severely cold, the occupants of a dwelling, having a hot air furnace, often desire to heat only one or two rooms, while the other rooms remain unheated. In order to meet this demand I provide an auxiliary gas heater, in the nature of a sectional hinged jacket, which may be readily thrown over and fastened around a hot air or hot water pipe, and the gas lighted. Though my heating jacket may be applied to both hot air and hot water pipes, I will, for convenience, show and describe it applied to a hot air pipe 2 which may lead from a furnace 1 located in the house cellar. The gas heating jacket 3 is preferably made of sheet metal in two longitudinal sections 4 and 5 which are connected on one side by hinges 6 and provided at their other meeting edges with flanges 7 provided with suitable fastening devices 8, such as screw bolts and nuts, as indicated, or any well known quick fastening devices.

The jacket will be made of sufficient length to heat a section of a pipe two or three feet long and of a size which may be readily handled and thrown over a hot air pipe, forming a heating space or passage around the same, for the circulation of hot products of combustion, as shown. The jacket is provided with a non-conducting coating or lagging 9 of asbestos or mineral wool. The section 5 is made with a bottom longitudinal recess or channel 10 for receiving the gas pipe 11, having burners 12. The gas pipe 11 may be screw threaded and secured in the channel by nuts, as indicated, and is preferably provided with a gas and air mixing chamber 13. After the heating jacket is in position on the pipe to be heated, the gas pipe 11 may be connected to a house service pipe by a flexible pipe or hose 14, or in any other convenient manner. Air inlet openings 16 are provided in the channel 10, Fig. 1, for admitting air to the burners. A relatively small escape pipe 15 for products of combustion is preferably connected with the upper section 4.

To the interior curved surfaces of the sections 4 and 5 are secured a series of longitudinal baffle plates, *a*, *b*, *c*, *d*, *e* and *f*, having openings alternately at opposite ends of the casing for causing circulation of hot products of combustion back and forth through the passages between the plates, so as to thoroughly impart their heat to the inclosed section of air pipe 2 before escaping through the relatively small outlet pipe 15. The baffle plates are set on radial lines so as to divide the jacket into nearly uniform passages and when the jacket is applied to pipe 2 they fit closely against the same. The ends of the jacket are also turned inward to make a close fit around pipe 2. Directly above the burners 12 I preferably place a horizontal perforated baffle plate *g* which may be secured by legs to the jacket, as indicated in Figs. 1 and 2. This plate serves for spreading the hot products and preventing them from impinging directly upon the under side of the air pipe 2.

As shown in Figs. 1 and 2, my gas heating jacket may be applied to any ordinary air pipe 2 in any convenient location, but is preferably applied to an air pipe in the basement near the hot air furnace.

I also construct my auxiliary heater with a special section of hot air pipes, as shown in the modification, Figs. 3 and 4. A section of hot air pipe 20 is constructed with a series of cross pipes 21 of brass or copper which serves as good conductors of heat and greatly increase the radiating surface. This section of pipe 20 may be readily inserted in the hot air pipe 2 and form a part thereof, as indicated in Fig. 3. A heating jacket 3 is made substantially as that described with reference to Figs. 1 and 2 and is applied to the section of air pipe in the same manner. Instead of a longitudinal baffle plate $g$, as in Fig. 1, I provide a series of small baffle plates $g'$ above the burners and between the tubes 21, so that the flames from intermediate burners may pass up into the tubes, as shown in Fig. 3. Evidently a part of the flames and products will pass through the tubes and another part will pass back and forth through the longitudinal compartments between the baffle plates $a$, $b$, $c$, $d$ and $e$ and escape through the small openings 15$^a$ at the rear end of the jacket. Air inlet openings 16$^a$ are made in the front end of the lower section 5 of the jacket, as shown in Fig. 4.

When it is desired to heat any particular room of a dwelling having a hot air furnace in the basement, the jacket 3 is thrown over the pipe, as 2, leading to such room, and secured by fastening devices 8; the gas pipe 11 is connected to a house service pipe by a flexible pipe 14, or other desired connection and the gas lighted. The flames and hot products circulating back and forth through the channels between the baffle plates, quickly and economically heat the air pipe, since the products are confined around the same and slowly escape through the small pipe 15 or opening 15$^a$. One or more rooms of a dwelling may thus be quickly supplied with hot air and warmed without kindling a fire in the furnace.

The heating jacket is very convenient, economical and satisfactory in use.

The details of construction of my gas heating attachment, or auxiliary heater, for pipes may be modified and varied without departing from the spirit and scope of my invention.

Having described my invention, what I claim, and desire to secure by Letters Patent, is—

1. A sectional detachable heating jacket attachment for a heating pipe, having a gas pipe and burners, longitudinal baffle plates of a suitable width to fit against an internal pipe and form connecting passages for causing hot products of combustion to circulate in contact with the pipe, and fastening devices for securing the sections on a pipe, substantially as described.

2. A sectional detachable heating jacket attachment composed of sections hinged together and provided with fastening devices at the meeting edges and having attached longitudinal baffle plates providing connecting passages and adapted to fit against an internal pipe and having a gas pipe and burners in one of the sections.

3. A detachable heating jacket attachment, composed of longitudinal sections hinged together and provided internally with attached baffle plates, forming connecting passages, one of the sections being provided with a longitudinal channel containing a gas pipe and burner, and the hinged sections being adapted to be clamped about a hot air pipe.

4. An auxiliary gas heater for a heating pipe, comprising a section of pipe provided with cross pipes, a surrounding heating jacket forming a circulating space around the inner pipe, into which the cross pipes open for passage of part of the products of combustion therethrough, a gas pipe and burners in the jacket, and means for causing hot products of combustion to circulate in contact with the inner pipe, substantially as described.

In testimony whereof I affix my signature in presence of two witnesses.

WALTER THOMAS.

Witnesses:
SPENCER ROBINSON,
LILLA E. NORMAN.